United States Patent Office 3,827,976
Patented Aug. 6, 1974

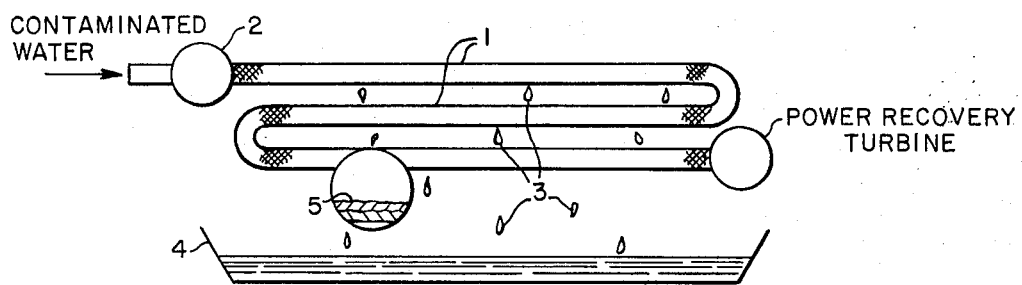

3,827,976
PROCESS FOR CLEANING REVERSE OSMOSIS MEMBRANES
Regis R. Stana, Murrysville, Pa., and Joseph Markind, Moorestown, N.J., assignors to Westinghouse Electric Corporation, Pittsburgh, Pa.
Filed July 11, 1972, Ser. No. 270,773
Int. Cl. B01d 13/00
U.S. Cl. 210—23
9 Claims

ABSTRACT OF THE DISCLOSURE

A process for cleaning reverse osmosis membranes which have been contaminated with water insoluble foulants comprises the steps of (A) contacting the reverse osmosis membrane, under pressure, with a cleaning solution containing, per liter of water, about 0.25–2.5 ml. of an organic non-ionic surfactant, about 20–75 grams of at least one salt selected from $Na_2SO_4$, $K_2SO_4$ and NaCl, and at least one mineral acid selected from hydrochloric and sulfuric acid in an amount effective to provide a cleaning solution having a pH between about 1.5–4.0 (B) releasing the pressure on the reverse osmosis membrane, and (C) flushing the solution from the membrane.

BACKGROUND OF THE INVENTION

In the operation of a reverse osmosis system, the limiting factor in the life of the membrane is generally the rate of fouling which occurs on the membrane. This fouling reduces both the water flux of the membrane and its salt rejection capability. A technique for quick removal of the fouling material is essential for the economic operation of a reverse osmosis system. Several chemical cleaning techniques have been developed for removal of specific foulants, such as the use of oxalic acid cleaning solution for the removal of iron (Noll et al. 3,536,637) and the use of acrylic acid-ammonium persulfate feedwater additives for the removal of calcium and magnesium scale (Rice et al. 3,589,998). However the success of these techniques depends on identification of the fouling material. If a variety of fouling materials are present, several cleaning procedures may be required. There is a need then for a cleaning technique that will quickly and economically remove most or all reverse osmosis membrane fouling materials.

SUMMARY OF THE INVENTION

We have discovered a process that will quickly and economically clean most fouling materials from a membrane contained within a reverse osmosis liquid treatment system. Briefly, our method consists of (1) contacting the fouled reverse osmosis membrane, under pressure, with a cleaning solution having a temperature between about 32°–55° C. and containing about 0.25–2.5 ml. of an organic non-ionic surfactant, about 20–75 grams of at least one salt selected from the group consisting of $Na_2SO_4$, $K_2SO_4$, and NaCl, per liter of water, and at least one mineral acid selected from the group consisting of hydrochloric acid and sulfuric acid in an amount effective to provide a cleaning solution having a pH between about 1.5–4.0, (2) releasing the pressure on the reverse osmosis membrane, and (3) flushing the contaminated solution from the membrane surface.

The release of pressure, after the cleaning solution contacts the membrane, causes liquid backflow through the membrane by natural osmosis. This backflow removes gross fouling attached to the osmotic skin side of the membrane and fouling residue trapped inside the membrane and its support. The acid dissolves most of the foulants, the hot water increases the rate of cleaning as well as the solubility of the fouling materials, the organic non-ionic surfactant acts as a wetting agent which easily penetrates the membrane, softens the foulants and keeps nonsoluble foulants suspended in the cleaning solution until they can be flushed away from the membrane surface, and the salt provides a solution with a high osmotic pressure to insure proper backflow through the membrane.

BRIEF DESCRIPTION OF THE DRAWING

For a better understanding of the invention, reference may be made to the preferred embodiment exemplary of the invention, shown in the accompanying drawing, which is a diagram showing the principle for extracting fresh water from sea or contaminated water by a reverse osmosis liquid treatment system containing a supported tubular membrane, feed inlet means and treated liquid outlet means.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

The drawing illustrates a typical tubular-type reverse osmosis system. Seawater or contaminated water is pumped through a battery of support tubes 1. The feed pump 2 can operate as high as 1,500 p.s.i. The tubes can be mounted in batteries of about 150 each. They serve to support the reverse osmosis membrane 5 contained within the tube wall. The membrane is usually made of an ether or ester cellulosic derivative. Generally, modified cellulose acetate is used. The membranes are generally cast from a solution of cellulose acetate, acetone and formide, and reference can be made to U.S. Pats. 3,170,867; 3,310,488; 3,344,214; 3,446,359; and 3,593,855 for detailed information concerning these materials and their method of manufacture. These membranes have a dense osmotic skin layer which faces the feedwater and a highly porous spongy sublayer which contacts the membrane support. Of course, other type membranes which have a uniform cross-section can be used in the reverse osmosis system and cleaned using the process of this invention.

The support tube may be made of a variety of materials such as porous fiberglass or perforated stainless steel. The preferred porous tubular support is a casting made from epoxy or phenolic resin bonded filler particles, such as sand, as described in U.S. Pat. 3,598,241. Of course, flat plate type reverse osmosis modules, which are well known in the art, can be also used to support the membranes. The tube walls that support the reverse osmosis membranes must be able to withstand the pressure exerted on them by the pump and must be able to allow egress of the pure water 3 into a collecting pan 4. For seawater several passes through a system of this type may be required before the water is usable.

The cleaning solution of this invention contains about 0.1–5.0 ml. of at least one mineral acid selected from the group consisting of commercially available 36–38 wt. percent C.P. Grade concentrated HCl and commercially available 95–98 wt. percent C.P. Grade concentrated $H_2SO_4$, about 0.25–2.5 ml. of an organic non-ionic surfactant and 20–75 grams of at least one salt selected from the group consisting of $Na_2SO_4$, $K_2SO_4$, and NaCl, per one liter of ordinary naturally buffered water. This will provide a cleaning solution with a pH between about 1.5–4.0. Preferably, from about 0.1–2.5 ml. of both HCl and $H_2SO_4$ are used as the acid component.

The mineral acids dissolve organic materials and mineral salts, such as, for example, $CaSO_4$, $MgSO_4$, $$Ca_3(PO_4)_2,$$

$Fe(OH)_2$, and $Fe(OH)_3$, which form as foulants on and within the membrane during purification of acid mine drainage water, seawater and other contaminated waters. The acid must be added in an amount which will be effective to provide a cleaning solution having a pH range of between about 1.5–4.0. A solution having a pH below 1.5 will hydrolyze the membrane and a pH above 4.0 will not effectively clean the membrane. Experimentation within the pH range will determine how much of each acid is effective for a particular application.

The surfactant must be effective at the low pH values of the cleaning solution. It is an organic water soluble non-ionic surface active agent of the alkylaryl polyether alcohol type. The preferred alkylaryl polyether alcohols have the chemical formula $$C_nH_{2n+1}(C_6H_4)(OCH_2CH_2)_mOH$$

where $n$ is 8–9 and $m$ is 5–9. A particularly suitable surfactant is an octyl phenoxy polyethoxy ethanol, which has the chemical formula: $C_8H_{17}(C_6H_4)(OCH_2CH_2)_{7-8}OH$, averaging 7–8 ethylene oxide units per molecule.

The surfactant must be effective as a wetting agent which easily penetrates the reverse osmois membrane at low pressures and permeates between the foulant and the membrane surface. When pressure is released on the reverse osmosis membrane, the surfactant, along with water, backflows through the support and membrane, removing fouling residue trapped inside the porous membrane and its support. The surfactant must also soften the foulant and help to keep non-soluble foulants suspended in the cleaning solution until they can be flushed away from the membrane surface. Below about 0.25 ml./l. and the surfactant will not be effective and above about 2.5 ml./l., the surfactant will not go into solution.

The salt is added in effective amounts to provide a cleaning solution with a high osmotic pressure. A cleaning solution is desired that will have a sufficient pressure gradient to cause a backflow of liquid at a rate of about 10–30 gal./ft.²/day when the pressure on the osmotic skin side of the reverse osmosis membrane is released in our method. This backflow in cellulose acetate membranes occurs from the spongy membrane sublayer to the dense osmotic skin side. The salt should contain large molecules that will be easily rejected by the reverse osmosis membrane under reduced pressure, and should be soluble in the solution. Below about 20 gr./l. and the pressure differential across the membrane will be ineffective and above 75 gr./l. additional salt does not improve cleaning.

In the method of this invention the cleaning solution is heated and then fed into the reverse osmosis system to contact the supported reverse osmosis membrane at a pressure between about 20 to 175 p.s.i. At this pressure some of the surfactant is forced through the osmotic skin of the membrane while the salt is easily rejected. After the cleaning solution is fed into the system and contacts the osmotic skin side of the membrane, the pressure is released, causing a backflow of surfactant, water, and residual foulant through the membrane and into the cleaning solution. The backflow is in the order of about 10–30 gal./ft.²/day, but is effective to remove gross fouling attached to the osmotic skin side of the membrane. Generally, the pressure can be released for a period of about 3–120 minutes for effective cleaning.

After this cleaning period the solution containing dissolved and suspended foulant is flushed from the system with pure water or saltwater at a pressure between about 15 to 150 p.s.i., after which the cleaning step may be repeated or normal operation of the water purification system resumed. Generally, the cleaning solution must be heated to a temperature of between about 32°–55° C. Under 32° C. and the solution will not have a catalytic effect and will take undue time to dissolve the foulant and over 55° C. the membrane structure will be broken down by hydrolysis.

EXAMPLE 1

A reverse osmosis membrane module, about 4' long and 4" in diameter, containing a supported membrane which had become fouled with $Fe(OH)_3$ and $Ca_3(PO_4)_2$ was cleaned. This module was kept wet and contained 18 standard tubular cellulose acetate reverse osmosis membranes connected in series. The membranes had a total surface area of about 10 sq. ft. The membranes were supported by a porous, tubular, phenolic resin bonded sandcasting, containing from about 2–18 wt. percent resin. The membrane containing module when new had a pure water flux (for feedwater containing about 2000 p.p.m. NaCl, fed at 250 p.s.i.) of about 40 gal./ft.²/day at about 25% rejection of dissolved solids. The pure water flux of the module before cleaning with the solution of this invention was about 10 gal./ft.²/day at about 23% rejection.

This wet module was attached to a feed pump, and then cleaned with the cleaning solution of this invention, having a pH of about 2.5, and a temperature of about 49° C. This cleaning solution contained 0.5 ml. of HCl (38% C.P. Grade), 0.5 ml. of $H_2SO_4$ (98% C.P. Grade), 0.25 ml. of organic, non-ionic surfactant of the octyl phenoxy polyethoxy ethanol type, having a pH of 6–8, an average molecular weight of about 536, and an average of 7–8 ethylene oxide units per molecule (sold commercially by Rohm and Haas under the trade name Triton X–114 octylphenol series surfactant), and 35 grams $Na_2SO_4$ per one liter of tap (naturally buffered) water.

This solution was pumped into the module and against the osmotic skin side of the supported cellulose acetate membrane, at about 50 p.s.i. After the hot cleaning solution was in the module the feed pump was turned off to release the pressure. Water then slowly flowed backward through the membrane as osmosis took place at a rate of about 15 gal./ft.²/day (the $Na_2SO_4$ in the solution had an osmotic pressure of about 200 p.s.i.). After about 5 minutes the module was rinsed and flushed with tap water at a pressure of about 50 p.s.i. The module was then tested at 300 p.s.i. with water containing about 2000 p.p.m. NaCl. The pure water flux in this case was increased to 42 gal./ft.²/day at about 25% rejection of dissolved impurities.

The results indicated that this combination process, using backflow through the membrane and effective amounts of acid-non-ionic surfactant, provided an improved reverse osmosis cleaning process that completely restored membrane usefulness.

EXAMPLE 2

Subsequently, an entire 10,000 gal./day reverse osmosis modules, similar to those described in Example 1, which had become fouled with $Fe(OH)_3$ and $Ca_3(PO_4)_2$ during commercial operation in a rinse water refuse system were cleaned with the solution of this invention. The cleaning solution having a pH of about 2.5 and a temperature of about 50° C., contained 0.5 ml. of HCl (38% C.P. Grade, 0.5 ml. of $H_2SO_4$ (98% C.P. Grade), 0.25 ml. of organic, non-ionic surfactant (Triton X–114) and 35 grams $Na_2SO_4$ per one liter of tap (naturally buffered) water.

The solution was pumped into the unit at about 50 p.s.i. After the hot solution was in the unit the feed pump was turned off. After about 5 minutes the unit was flushed with water. After five more similar cleanings, required due to the bulk of the system, the pure water flux was restored to 40 gal./ft.$^2$/day from 2 gal./ft.$^2$/day and the percent rejection was restored from 23% to 25%. The unit was tested at 250 p.s.i. with water containing about 2000 p.p.m. NaCl.

The cleaning solution and process of this invention has also successfully cleaned reverse osmosis membrane modules fouled on tap water ($CaSO_4$( $Ca_3(PO_4)_2$ and $FeOH_3$ residue), black sulfate liquor (organic $SO_4$ residue), orange peel extract (orange oil plus gross organic residue) and tobacco extract (gross organic residue).

We claim:

1. A process for cleaning reverse osmosis membranes which comprises the steps of:
   (a) contacting the reverse osmosis membrane, under pressure, with a hot cleaning solution comprising, per one liter of water:
      (i) abuot 0.25–2.5 ml. of an organic water soluble non-ionic surfactant,
      (ii) about 20–75 grams of at least one salt selected from the group consisting of $Na_2SO_4$, $K_2SO_4$ and NaCl,
      (iii) at least one mineral acid selected from the furic acid, in an amount effective to provide a cleaning solution having a pH of between about 1.5–4.0, said pressure causing surfactant to flow through the membrane,
   (b) releasing the pressure on the reverse osmosis membrane, to cause a backflow of surfactant through the membrane, and
   (c) flushing the solution from the membrane.

2. The process of claim 1 wherein the cleaning solution has a temperature of between about 32° C.–55° C.

3. The process of claim 1 wherein the pressure applied in step (a) is between about 20–175 p.s.i., and the surfactant is an alkylaryl polyether alcohol.

4. The process of claim 3 wherein the pressure released in step (b) causes a backflow of liquid through the membrane at a rate of about 10–30 gal./ft.$^2$/day.

5. The process of claim 4 wherein the pressure is released for about 3–120 minutes and the solution is flushed in step (c) at a pressure of between about 15–150 p.s.i.

6. The process of claim 4 wherein the surfactant has a pH of about 6–8 and the chemical formula $$C_nH_{2n+1}(C_6H_4)(OCH_2CH_2)_mOH$$

where $n$ is 8–9 and $m$ is 5–9 and wherein the cleaning solution contains both hydrochloric and sulfuric acid.

7. The process of claim 4 wherein the surfactant has the chemical formula $C_8H_{17}(C_6H_4)(OCH_2CH_2)_{7-8}OH$.

8. The process of claim 4 wherein the membrane is a cellulose acetate membrane having a dense osmotic skin layer and a spongy layer and the cleaning solution contacts the dense osmotic skin layer in step (a).

9. The process of claim 8 wherein the membrane is a tubular membrane and is supported by a resin bonded filler particle casting.

References Cited

McCutchan et al.: Reverse Osmosis at Coalinga, California," a paper presented May 1969, at annual conf. AWWA, pp. 346–353 of Journal.

1968 Saline Water Conversion Report, published by Supt. of Documents, June 6, 1959, 489 pages, pp. 374–378 relied on.

FRANK A. SPEAR, JR., Primary Examiner

U.S. Cl. X.R.
210—321, 433